Aug. 25, 1931.   C. LIEBLEIN   1,820,466
COLLAPSIBLE DELIVERY WAGON
Filed Jan. 22, 1930
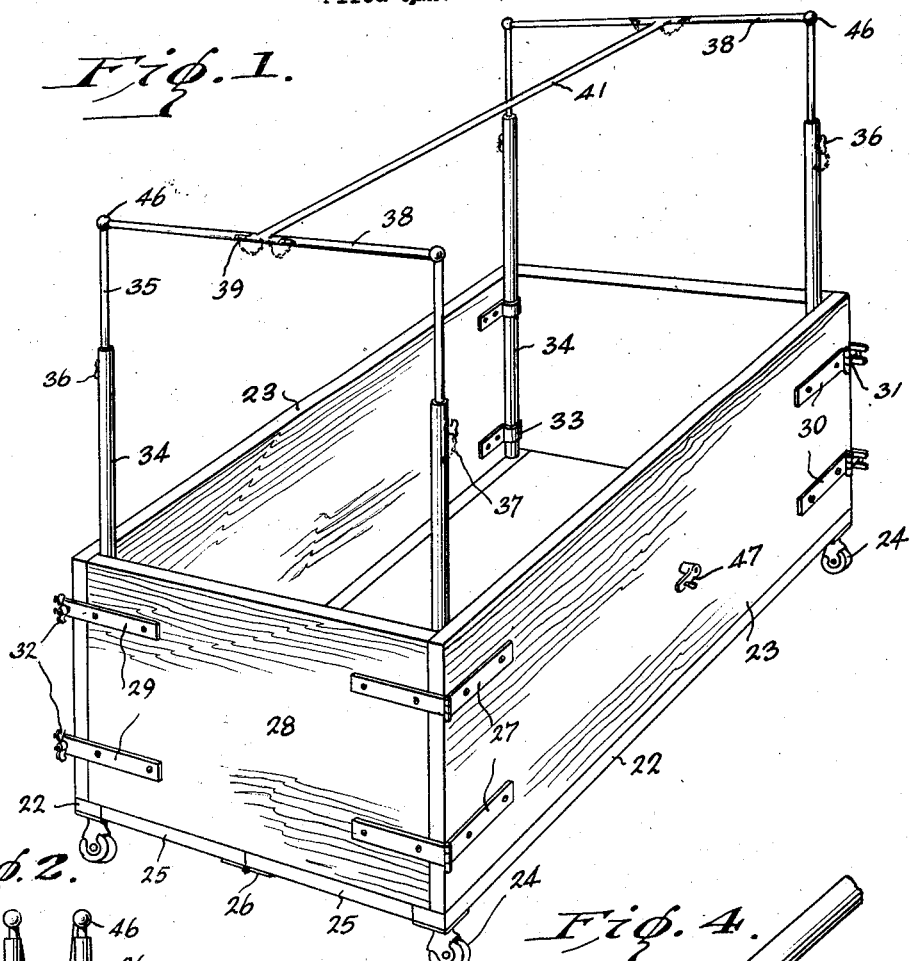
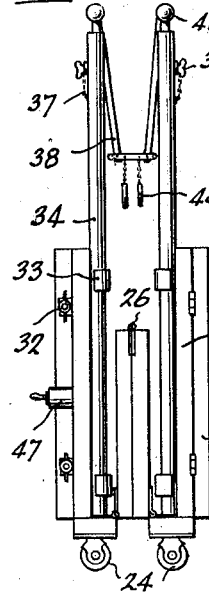
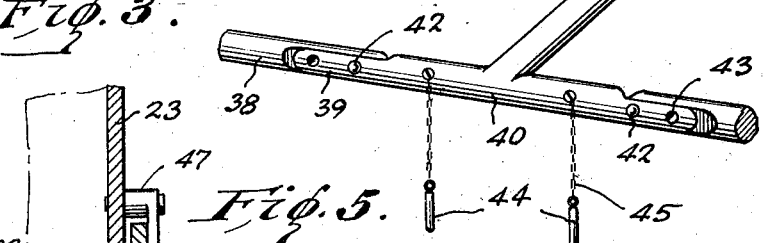
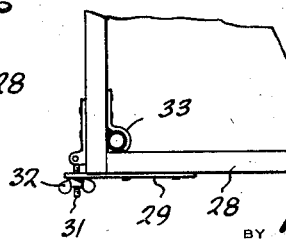
CHAIM LIEBLEIN
INVENTOR
BY Victor J. Evans
ATTORNEY
WITNESS: AJMank Patented Aug. 25, 1931

1,820,466

UNITED STATES PATENT OFFICE

CHAIM LIEBLEIN, OF NEW YORK, N. Y.

COLLAPSIBLE DELIVERY WAGON

Application filed January 22, 1930. Serial No. 422,608.

My present invention has reference to a push cart or wagon for delivery purposes and which may be employed as a trailer for other vehicles, and the primary object of the invention is the provision of a cart or wagon which, while desirably made up of foldable sections which may be collapsed to provide a small package for storage when not required for use, will incorporate a novel and valuable top frame adjustable to vary the height thereof.

A further object is the provision of a cart or delivery wagon which is collapsible and which may be adjusted to vary the height thereof.

A further object is the provision of a delivery cart or wagon of the type above indicated which shall embody few simple parts that may be readily associated.

For a full and comprehensive understanding of the improvement reference is to be had to the accompanying drawings which are to be read in connection with the following description and especially to the claims appended hereto.

In the drawings:

Figure 1 is a perspective view of the improvement.

Figure 2 is an end elevation showing the manner in which the construction disclosed by Figure 2 is collapsed or folded.

Figure 3 is a detail longitudinal sectional view to show the manner in which the foldable ends are held against the sides.

Figure 4 is a detail perspective view to illustrate the manner in which the ends of the frame are hingedly connected to the central member thereof.

Figure 5 is a detail plan view looking toward one of the corners of the device when in set up condition, the tubular socket and post being in section.

In carrying out my invention I make use of two timbers that provide sills 22. To the top and to the inner edges of the sills I hinge, as at 26, the bottom boards 25 of the improvement. The bottom boards, when the device is set up have their ends contacted and these boards are connected together at their said confronting ends by hinges 26 which are arranged on the under faces of the said bottom wall.

Rigidly secured to the top of the sill there are the sides 23 of the improvement.

The sills 22 have on their under faces caster wheels 24.

The sides 23, at the diagonally opposed corners thereof have secured thereon the straps or hinges 27 which connect to the said sides the end members 28. The second or free ends of the members 28 have fixed on their outer faces plates 29 which extend therebeyond and have their said extensions slotted. The slides 23, adjacent to the ends opposite those provided with the hinges have fixed on the outer faces thereof plates 30 on whose outer ends there are pivoted bolts 31 that are swingable through the slotted ends of the plates 29. The bolts 31 are engaged by wing nuts 32 which contact with the plates 29 for holding the ends in set up position.

Fixedly secured to the inner faces of the sides 23, adjacent to the upper and lower ends thereof there are clips 33 that grippingly engage with tubular standards 34. The standards provide sockets for corner posts 35. The standards project a suitable distance through the open top of the body and have threaded therethrough wing nuts 36 to engage with the posts 35. Flexible elements 37 hold the bolts 36 on the tubular standards 34.

Preferably but not necessarily swiveled to the outer ends of the posts 35 there are inwardly directed rods 38. The confronting ends of these rods 38 are spaced away from each other and are flattened and engaged by the flattened ends 39 on the lateral extensions or heads 40 of a rod or bar 41. The flattened ends 40 are pivotally secured, as at 42, to the ends of the rods 38, and the flattened ends of both the rods and the heads 40 are provided with openings 43 that are designed to aline and to have received therethrough pins 44 suspended by flexible elements 45 from the lateral ends 40 of the top rod or bar 41, and whereby the said ends 40 are held in longitudinal alinement with the rods 38 when the device is in set up position. By removing the pins the rods 38 may be swung against the corner posts 39 by the loose or swivel connection 46 between the said rods and posts.

The frame may be collapsed in a manner as above indicated, and the body is collapsed or folded by swinging the ends 28 against the outer faces of the sides 23. When so swung the ends are engaged by clamps 47 carried by the sides. Thereafter the bottom sections 25 are folded inwardly as disclosed by Figure 2 of the drawings and the collapsed structure may be readily wheeled to a place of storage and occupy only small room therein.

It is believed that the foregoing description, when read in connection with the accompanying drawings will fully set forth the construction and advantages of my improvement but obviously I do not wish to be restricted to the precise details herein set forth and, therefore, hold myself entitled to make such changes therefrom as fairly fall within the scope of what I claim.

Having described the invention, I claim:

1. A foldable and collapsible wagon comprising sills mounted on wheels, sides fixedly secured to the sills, a bottom comprising two sections, each of which is hingedly secured to the respective sills, said bottom having its confronting ends hingedly connected, ends hingedly secured to the diagonally opposed corners of the sides, swingable between the sides and means for connecting the free ends of the ends to the sides and an open frame comprising telescopic members arranged at the corners of the wagon, swivelly secured inwardly directed rods on the outer elements of the corner members, a longitudinal member having angle ends pivoted to the rods and removable means for securing the angle ends of the rods for holding said rods and ends in alinement.

2. A foldable and collapsible wagon comprising sills mounted on wheels, sides fixedly secured to the sills, a bottom comprising two sections, each of which is hingedly secured to the respective sills, said bottom having its confronting ends hingedly connected, ends hingedly secured to the diagonally opposed corners of the sides, swingable between the sides and means for connecting the free ends of the ends to the sides, clips fixed in the sides adjacent to the corners thereof, tubular standards secured to the clips, posts slidable in the standards, binding means between the standards and posts, rods swivelly secured to the outer ends of the posts having spaced ends which are flat, a central longitudinal member having angle ends provided with flat portions for lapping engagement with the flat ends of the rods and pivotally secured thereto, said angle ends and rods having alining openings therethrough and pins flexibly supported from the rods for insertion through said openings.

In testimony whereof I affix my signature.

CHAIM LIEBLEIN.